United States Patent
Kaida et al.

(10) Patent No.: US 7,889,309 B2
(45) Date of Patent: Feb. 15, 2011

(54) MANUFACTURING METHOD OF LIQUID CRYSTAL DISPLAY PANEL AND MANUFACTURING APPARATUS OF LIQUID CRYSTAL DISPLAY PANEL

(75) Inventors: Kazuya Kaida, Nara (JP); Akinori Izumi, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1144 days.

(21) Appl. No.: 10/573,301

(22) PCT Filed: Sep. 2, 2004

(86) PCT No.: PCT/JP2004/012727

§ 371 (c)(1),
(2), (4) Date: Mar. 22, 2006

(87) PCT Pub. No.: WO2005/029166

PCT Pub. Date: Mar. 31, 2005

(65) Prior Publication Data

US 2007/0052913 A1    Mar. 8, 2007

(30) Foreign Application Priority Data

Sep. 24, 2003  (JP) .............................. 2003-331418
Sep. 24, 2003  (JP) .............................. 2003-331419

(51) Int. Cl.
*G02F 1/13*  (2006.01)
(52) U.S. Cl. ...................... 349/187; 349/124; 349/190
(58) Field of Classification Search ................. 349/124, 349/187

See application file for complete search history.

(56) References Cited

U.S. PATENT DOCUMENTS

| 5,725,032 A * | 3/1998 | Oshima et al. ................. 141/7 |
| 6,793,987 B2 * | 9/2004 | Shin et al. .................. 428/1.25 |
| 6,892,437 B2 * | 5/2005 | Uh et al. ..................... 29/564.7 |
| 6,922,229 B2 * | 7/2005 | Yawata et al. ................ 349/187 |
| 2003/0147039 A1 * | 8/2003 | Lee et al. .................... 349/187 |
| 2003/0178134 A1 | 9/2003 | Muramoto et al. |
| 2003/0226633 A1 | 12/2003 | Muramoto et al. |
| 2005/0024580 A1 * | 2/2005 | Horiuchi et al. ............. 349/187 |

FOREIGN PATENT DOCUMENTS

| JP | 05-307160 | 11/1993 |
| JP | 2001-242471 | 9/2001 |
| JP | 2001-305545 | 10/2001 |

(Continued)

*Primary Examiner*—Richard H Kim
(74) *Attorney, Agent, or Firm*—George W. Neuner; David G. Conlin; Edwards Angell Palmer & Dodge LLP

(57) ABSTRACT

A manufacturing method of a liquid crystal display panel includes: a sealant arranging step of arranging a sealant on a main surface of one of or each of two substrates to be bonded to each other; a liquid crystal dropping step of dropping liquid crystal on one of the two substrates; and a bonding step of bonding the two substrates to each other, wherein the method further includes: to be performed prior to the liquid crystal dropping step, a deaerating step of arranging in a pressure-reduced atmosphere at least a substrate on which the liquid crystal is to be dropped out of the two substrates; and, to be performed prior to the bonding step, a releasing step of releasing the pressure-reduced atmosphere by an inert gas.

8 Claims, 7 Drawing Sheets

FOREIGN PATENT DOCUMENTS

| | | |
|---|---|---|
| JP | 2002-107710 | 4/2002 |
| JP | 2002-323687 | 11/2002 |
| JP | 2003-107481 | 4/2003 |
| JP | 2003-270609 | 9/2003 |
| JP | 2004-070274 | 3/2004 |
| JP | 2004-151325 | 5/2004 |

* cited by examiner

MANUFACTURING METHOD OF LIQUID CRYSTAL DISPLAY PANEL AND MANUFACTURING APPARATUS OF LIQUID CRYSTAL DISPLAY PANEL

TECHNICAL FIELD

The present invention relates to a manufacturing method of a liquid crystal display panel and a manufacturing apparatus of a liquid crystal display panel. In particular, it relates to a manufacturing method of a liquid crystal display panel and a manufacturing apparatus of a liquid crystal display panel wherein the manufacture is carried out in accordance with the liquid crystal dropping scheme.

BACKGROUND ART

A liquid crystal display panel is constituted by two opposing substrates between which liquid crystal is enclosed. FIG. 7 is a schematic cross-sectional view of an exemplary color liquid crystal display panel, which is one of liquid crystal display panels. Liquid crystal 30 is enclosed as interposed between a TFT (Thin Film Transistor) substrate 1 and a CF (Color Filter) substrate 5. On a main surface of TFT substrate 1, a scan line drive circuit 2 is formed and connected to an external drive IC (not shown). On a main surface of scan line drive circuit 2, a pixel electrode layer 3 is formed. In pixel electrode layer 3, in addition to a pixel electrode, a TFT is also formed. On a main surface of pixel electrode layer 3, an alignment film 4 is formed.

On a main surface of a CF substrate 5 opposing to TFT substrate 1, a color filter 6 is formed. Color filter 6 has the hue of three; red, green and blue. On a main surface of color filter 6, a common electrode 7 is formed. On a main surface of common electrode 7, an alignment film 8 is formed. Liquid crystal 30 is charged to be interposed between alignment film 4 and alignment film 8, and a sealant 31 is arranged on the side of liquid crystal 30. That is, liquid crystal 30 is enclosed so as to be surrounded by alignment films 4 and 8 and sealant 31. A certain space is kept between alignment films 4 and 8 by a spacer 9 interposed between them. Thus, liquid crystal 30 directly contacts to alignment films 4 and 8 and sealant 31. The two substrates are fixedly adhered to each other by sealant 31. In the present specification and the claims, a single substrate such as a TFT substrate, and a single substrate wherein a pixel electrode layer, an alignment film and the like are formed are both simply referred to as "a substrate".

Among manufacturing methods of a liquid crystal display panel, there is a manufacturing method referred to as liquid crystal dropping scheme. FIG. 8 shows steps of the liquid crystal dropping scheme. First, a color filter and a pixel electrode layer are respectively formed on two substrates, and thereafter an alignment film is formed on each of the substrates. Next, a sealant is arranged on a main surface of one of or each of the alignment films respectively formed on the TFT substrate and the CF substrate. Next, liquid crystal is dropped on the main surface of one of the substrates' alignment films by a required amount. FIG. 9 is a schematic cross-sectional view wherein the two substrates are bonded to each other in accordance with the liquid crystal dropping scheme. In FIG. 9, components such as the spacer and the color filter other than alignment films 4 and 8 are not shown. In bonding the substrates as shown in FIG. 9, sealant 31 is arranged on the main surface of alignment film 8 formed on CF substrate 5, and liquid crystal 30 by a required amount is dropped on the main surface of alignment film 4 formed on the opposite TFT substrate 1. In bonding the substrates, as indicated by arrow 50, respective main surfaces of the two substrates are kept in parallel to each other and drawn toward each other to be fixedly adhered. The bonding of the two substrates is performed in a pressure-reduced atmosphere. The arrangement of the sealant and the dropping of the liquid crystal after the formation of the alignment films on substrates are performed in a released atmosphere, and the bonding of the substrates alone is performed in a pressure-reduced atmosphere.

The alignment films are made of a porous material, and therefore their surfaces easily adsorb moisture. If moisture is mixed into the liquid crystal, a problem arises that a voltage holding ratio decreases and that an image is unevenly shown or shown with spots. In order to prevent moisture from mixing into liquid crystal as a result of the moisture having been adsorbed by the surfaces of alignment films and the like, the manufacturing process includes a step of arranging the substrates in a pressure-reduced atmosphere for a certain period, which is referred to as a deaerating step. In order to carry out the deaerating step, a vacuum chamber, a vacuum pump and the like are necessary for reducing the pressure around the entire substrates. In order to successively carry out the steps from the arrangement of the sealant to the bonding of the substrates in a pressure-reduced atmosphere, a facility of enormous size is required. Additionally, if the deaerating step is carried out prior to the arrangement of the sealant, the substrates after the deaerating step are stored in a released atmosphere from the arrangement of the sealant until the bonding of the substrates. During this period, moisture in the air may again be adsorbed by the main surface of the alignment film, for example. Accordingly, the deaerating step is carried out immediately before bonding the two substrates to each other. The other steps such as arranging the sealant, dropping the liquid crystal, transporting the product and the like are generally carried out in a released atmosphere.

Japanese Patent Laying-Open No. 2003-107481 discloses a manufacturing method of a liquid crystal display panel wherein water adsorption of an alignment film immediately before arrangement of a sealant is set to be less than 4 weight %, and each step after formation of the arrangement films and at least until completion of bonding is carried out in an environment of humidity of less than 40%. In the manufacturing method, for example, after the alignment films are formed, storage or assembly is conducted in an environment wherein humidity is less than 40%, and storage or assembly is conducted while dry air is purged onto the substrates. The step of arranging sealant on the surface of a substrate is performed in an atmosphere of dry air, for example, and the steps of dropping liquid crystal and bonding the substrates are performed in an atmosphere of vacuum. According to this method, moisture is prevented from being adsorbed by the alignment films in storing or assembling the substrates, and therefore a liquid crystal panel not involved with residual images can be manufactured.

Japanese Patent Laying-Open No. 2001-305545 discloses a manufacturing method for preventing moisture or adsorptive gases from being adsorbed by alignment film surfaces by inactivating the alignment film surfaces immediately after a rubbing process. According to this method, a heating process is performed on the alignment film surfaces immediately after the rubbing process at the temperature of at least 80° C. and less than 100° C. for a prescribed period to thereby inactivate the polarity of the alignment film surfaces. Thus, moisture or adsorptive gases are prevented from being adsorbed by the alignment film surfaces, whereby various unevenness in display can be prevented.

Patent Document 1: Japanese Patent Laying-Open No. 2003-107481 (pages 3-5, FIGS. 2-5)

Patent Document 2: Japanese Patent Laying-Open No. 2001-305545 (pages 3 and 4)

DISCLOSURE OF THE INVENTION

Problems to be Solved by the Invention

As above, generally, the deaerating step of arranging substrates in a pressure-reduced atmosphere is carried out immediately before the substrates are bonded to each other. FIGS. 10A and 10B are schematic enlarged cross-sectional views respectively showing liquid crystal and a sealant arranged on alignment films' main surfaces in a released atmosphere. FIG. 10A is an enlarged cross-sectional view illustrating the state where liquid crystal is dropped on the main surface of the alignment film. As the alignment film is made of a porous material, the moisture in the air is adsorbed by the alignment film surface if the alignment film is left in the air. Before substrates are bonded to each other, the deaerating step is carried out and whereby most of such moisture evaporates. However, a region in the main surface of alignment film 4 where liquid crystal 30 is dropped is covered by liquid crystal 30, and therefore moisture does not evaporate. As a result, as shown by dashed line 40 in FIG. 10A, the moisture adsorbed by alignment film 4 remains. As to the sealant, similarly, as shown in FIG. 10B, in a region in the main surface of alignment film 8 where sealant 31 is arranged, the moisture adsorbed by alignment film 8 remains as indicated by dashed line 41.

FIG. 11 is an explanatory view of a problem caused when two substrates are bonded to each other while such moisture is retained and a liquid crystal display panel is manufactured. FIG. 11 is a schematic plan view of a liquid crystal display panel 35. Sealant 31 is formed in a ring-like shape, and liquid crystal is enclosed in the region surrounded by sealant 31. In the region where liquid crystal is enclosed, an image display portion 44 is where an image is displayed. On the liquid crystal display panel, wherein moisture remains in part of the alignment film covered by the dropped liquid crystal and in part of the alignment film covered by the sealant, defective display parts 45 and 46 appear. Defective display part 45 is a part with a defect corresponding to the region where the liquid crystal has been dropped and the surrounding portion, whereas defective display part 46 is a part with a defect along sealant 31. Defective display part 46 is caused by moisture adsorbed by the alignment film and then mixed into the liquid crystal via sealant 31. In such regions, images are displayed with spots or unevenness. In particular, those images that are actually black are displayed whitish. Thus, there has been a problem that moisture mixes into the liquid crystal, whereby the voltage holding ratio is decreased to invite defective display.

There is a manufacturing method in which what is called multiple production is performed, wherein a plurality of liquid crystal cells are formed on a mother substrate and thereafter the substrate is cut by each liquid crystal cell, so that the cost is reduced and the productivity is improved. The number of cells on the mother substrate surface for arranging a sealant now reaches some hundreds per one mother substrate. It is assumed that the number of cells per one mother substrate continues to increase. In accordance with the increase in the number of the cells, the mother substrate tends to be increased in its size. Some exceed one meter diagonally. Arrangement of a large number of the sealant on such a large mother substrate requires a long time, during which the moisture released in the air is again adsorbed. Accordingly, even if the deaerating process is performed immediately before arranging the sealant, it is not effective enough against the moisture mixing into the liquid crystal.

According to the manufacturing method in Japanese Patent Laying-Open No. 2003-107481, it is necessary to store the substrates after forming the alignment films and until arranging the sealant in one of the following atmospheres: an atmosphere of low humidity; an atmosphere where the air is substituted by an inert gas; and a pressure-reduced atmosphere. Further, continuously, the sealant must be arranged in such atmospheres. Accordingly, there is a problem that the facility for storing the substrates or for arranging the sealant becomes large in size. In particular, for a large mother substrate which exceeds one meter diagonally requires very expensive substrate storage facility and sealant arrangement facility, and whereby the productivity is reduced while the costs become extremely expensive. Additionally, in a manufacturing method where heat treatment and atmosphere release are performed after the substrates are stored, decomposition reaction in the alignment films progresses since the alignment films are heated. Additionally, there has been a problem that the moisture once removed by heat treatment is again adsorbed by the alignment films due to the atmosphere release.

According to the manufacturing method disclosed in Japanese Patent Laying-Open No. 2001-305545, there has been a problem that decomposition reaction associated with heating in the alignment films progresses, since the alignment films are heated and thereafter the atmosphere release is performed. Additionally, since the atmosphere release is performed later, there has been a problem that the moisture is adsorbed by the alignment films again.

The present invention has been made to solve the problems above, and an object thereof is to provide a manufacturing method and a manufacturing apparatus with which moisture is prevented from mixing into liquid crystal even with a large mother substrate, and with which a liquid crystal display panel is manufactured with high productivity.

Means for Solving the Problems

In a first aspect of a manufacturing method of a liquid crystal display panel according to the present invention, the method includes: a sealant arranging step of arranging a sealant on a main surface of one of or each of two substrates to be bonded to each other; a liquid crystal dropping step of dropping liquid crystal on one of the two substrates; and a bonding step of bonding the two substrates to each other. The method further includes: to be performed prior to the sealant arranging step, a deaerating step of arranging in a pressure-reduced atmosphere at least a substrate on which the sealant is to be arranged out of the two substrates; and, to be performed prior to the bonding step, a releasing step of releasing the pressure-reduced atmosphere by an inert gas. Employing this method, moisture can be removed in advance from a substrate on which a sealant is arranged, even if it is a large mother substrate, to thereby prevent moisture from being adsorbed when the substrate is arranged in the air thereafter. Thus, a liquid crystal display panel of which defective display is prevented can be manufactured. Additionally, the productivity is improved.

Preferably, in the invention above, the releasing step is performed prior to the sealant arranging step. Employing this method, the sealant arranging step can be performed in the air, and the productivity is improved.

Preferably, in the invention above, the sealant arranging step is performed within 30 minutes after the releasing step.

Employing this method, the sealant can be arranged before most of the inert gas adsorbed by the substrates leaves. Thus, a liquid crystal display panel of which defective display is more surely prevented can be manufactured.

Preferably, in the invention above, the deaerating step includes a step of arranging the two substrates together in the pressure-reduced atmosphere. Employing this method, a deaerating step immediately before the bonding step that has been performed conventionally can be eliminated.

Preferably, in the invention above, the releasing step is performed after the sealant arranging step and the liquid crystal dropping step. Employing this method, moisture adsorbed by the two substrates can be removed. Thus, a liquid crystal display panel of which defective display is more surely prevented can be manufactured. Further, in addition to the defective display around a region where the sealant is arranged, defective display in a region where the liquid crystal is dropped can also be prevented.

Preferably, in the invention above, the releasing step is performed prior to the liquid crystal dropping step, and the liquid crystal dropping step is performed within 30 minutes after the releasing step. Employing this method, a liquid crystal display can be manufactured of which defective display around a region where the liquid crystal is dropped is prevented, in addition to defective display around a region where the sealant is arranged.

In a second aspect of a manufacturing method of a liquid crystal display panel according to the present invention, the method includes: a sealant arranging step of arranging a sealant on a main surface of one of or each of two substrates to be bonded to each other; a liquid crystal dropping step of dropping liquid crystal on one of the two substrates; and a bonding step of bonding the two substrates to each other. The method further includes: to be performed prior to the liquid crystal dropping step, a deaerating step of arranging in a pressure-reduced atmosphere at least a substrate on which the liquid crystal is to be dropped out of the two substrates; and, to be performed prior to the bonding step, a releasing step of releasing the pressure-reduced atmosphere by an inert gas. Employing this method, moisture can be removed in advance from a substrate on which liquid crystal is dropped, even if it is a large mother substrate, to thereby prevent moisture from being adsorbed when the substrate is arranged in the air thereafter. Thus, a liquid crystal display panel of which defective display is prevented can be manufactured. Additionally, the productivity is improved.

Preferably, in the invention above, the releasing step is performed prior to the liquid crystal dropping step, and the liquid crystal dropping step is performed within 30 minutes after the releasing step. Employing this method, moisture can surely be prevented from being adsorbed again, and defective display can be prevented.

Preferably, in the invention above, the deaerating step includes a step of arranging the two substrates together in the pressure-reduced atmosphere. Employing this method, a deaerating step immediately before the bonding step that has been performed conventionally can be eliminated.

A manufacturing apparatus according to the present invention is used in a manufacturing method of a liquid crystal display panel, the method including: a sealant arranging step of arranging a sealant on a main surface of one of or each of two substrates to be bonded to each other; a liquid crystal dropping step of dropping liquid crystal on one of the two substrates; and a bonding step of bonding the two substrates to each other, wherein the apparatus includes: pressure-reduced atmosphere creating means for arranging the substrates in a pressure-reduced atmosphere; and releasing means for releasing the pressure-reduced atmosphere by an inert gas. Employing this method, a manufacturing apparatus of a liquid crystal display panel with which moisture can be removed and can be prevented from being adsorbed again before bonding the two substrates can be provided.

Preferably, in the present invention, the pressure-reduced atmosphere creating means includes a vacuum chamber, a substrate arranging member for arranging the substrates in the chamber, and a vacuum pump for evacuating the vacuum chamber. The releasing means includes inert gas introducing means for introducing an inert gas into the vacuum chamber. Employing this structure, a manufacturing apparatus of a liquid crystal display panel can easily be formed.

Preferably, in the present invention, the vacuum chamber is formed so that the two substrates to be bonded to each other can be accommodated. Employing this structure, two substrates can be accommodated at the same time in one vacuum chamber or the like, and a time for shifting to a bonding step can be reduced. Additionally, the works in shifting to the bonding step is reduced and whereby the productivity is improved.

Effects of the Invention

A manufacturing method and a manufacturing apparatus of a liquid crystal display panel are provided, with which moisture is prevented from mixing into liquid crystal and with which productivity is improved, and which is applicable even to a large mother substrate.

DESCRIPTION OF THE REFERENCE SIGNS

1 TFT substrate; 2 scan line drive circuit; 3 pixel electrode layer; 4, 8 alignment film; 5 CF substrate; 6 color filter; 7 common electrode; 9 spacer; 11 inert gas introducing means; 12 air supply pipe; 13 air supply valve; 14 cylinder; 16 vacuum evacuating means; 17 evacuation pipe; 18 evacuation valve; 19 vacuum pump; 20 vacuum chamber; 21 support base; 22 open/close door; 25 vacuum vessel; 30 liquid crystal; 31 sealant; 35 liquid crystal display panel; 40, 41 dashed line; 44 image display portion; 45, 46 defective display portion; and 50 arrow.

BEST MODES FOR CARRYING OUT THE INVENTION

First Embodiment

Referring to FIGS. 1-4, a manufacturing method of a liquid crystal display panel and a manufacturing apparatus of a liquid crystal display panel according to a first embodiment of the present invention is described.

Figure 1:
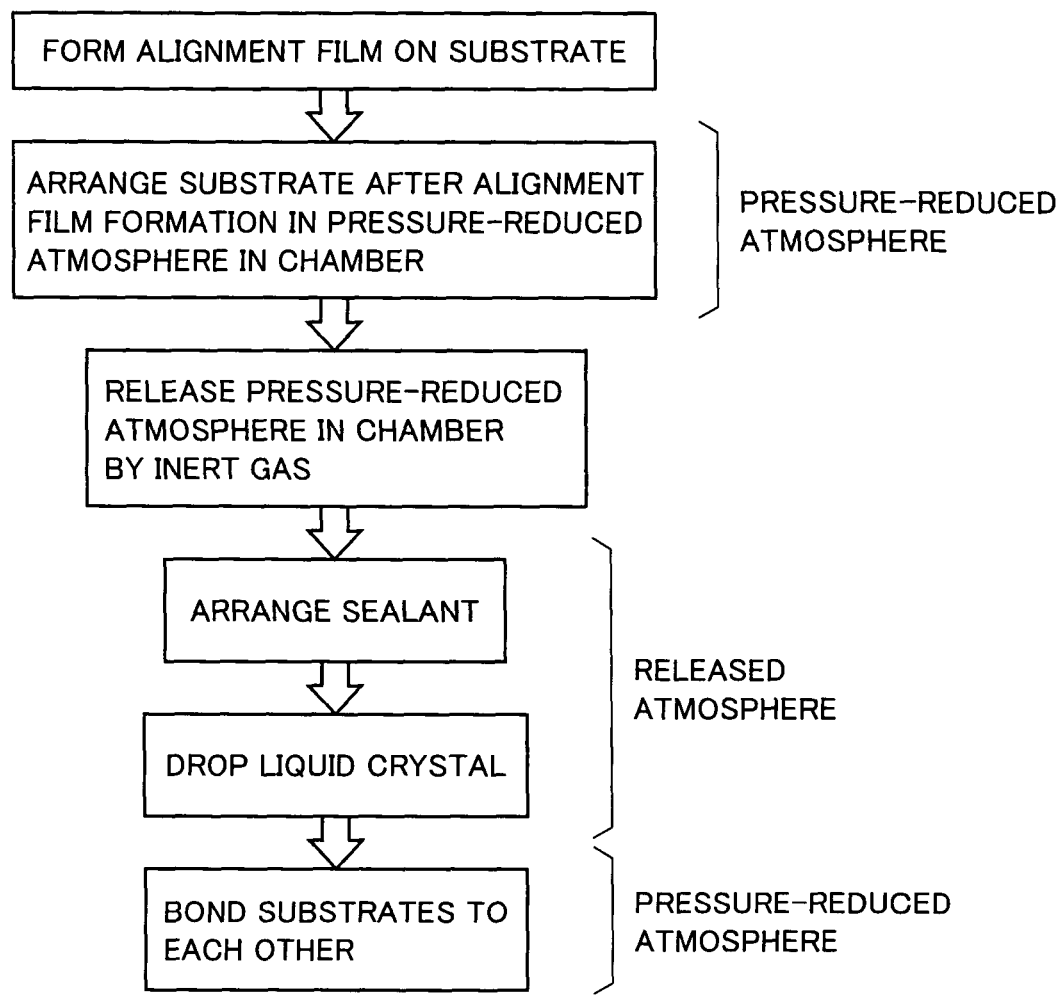
FIG. 1 is a process chart of a manufacturing method according to a first embodiment.
Figure 7:
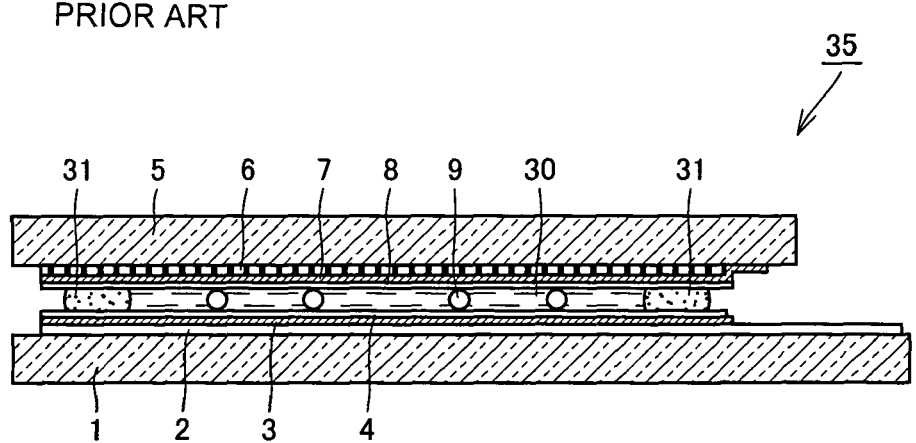
FIG. 7 is a schematic cross-sectional view of a color liquid crystal display panel.
Figure 8:
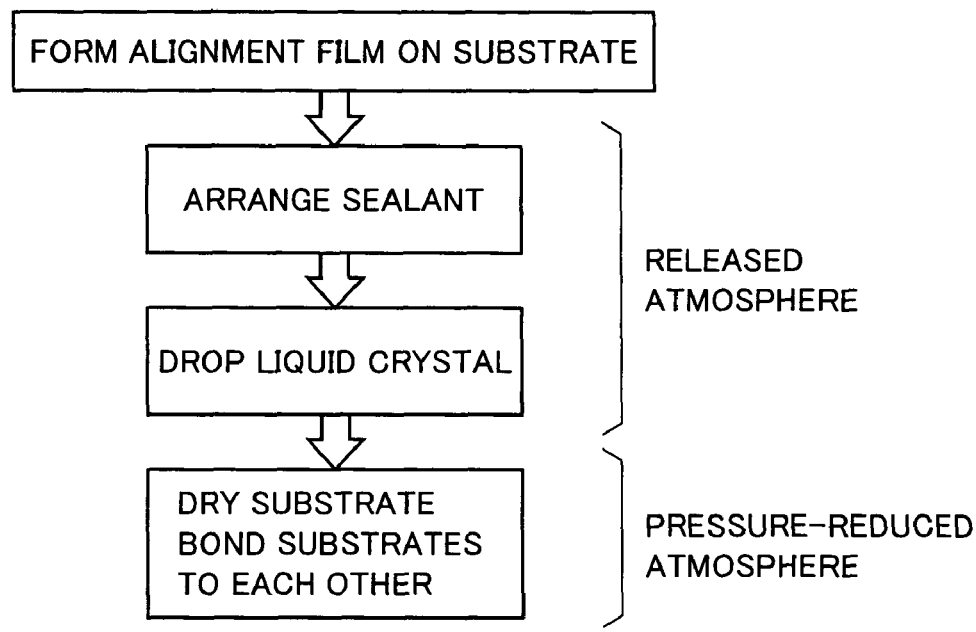
FIG. 8 is a process chart of a manufacturing method of a liquid crystal display panel based on a conventional technique.
Figure 9:
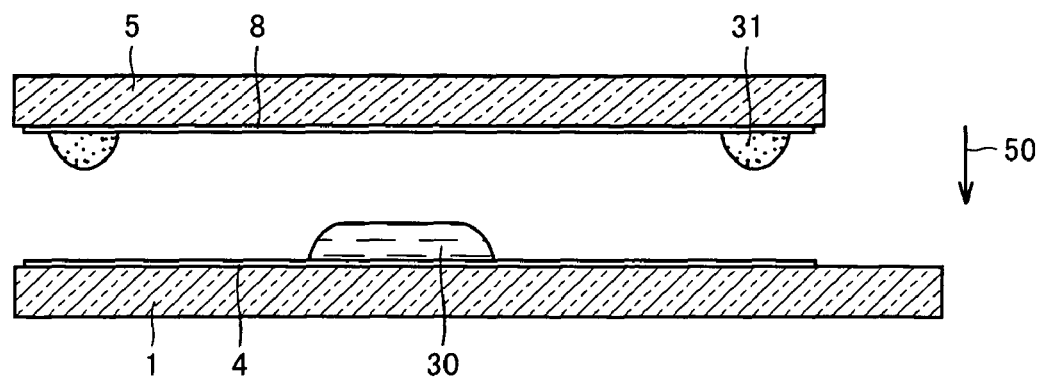
FIG. 9 is a cross-sectional view illustrating the liquid crystal dropping scheme.
Figure 10A:
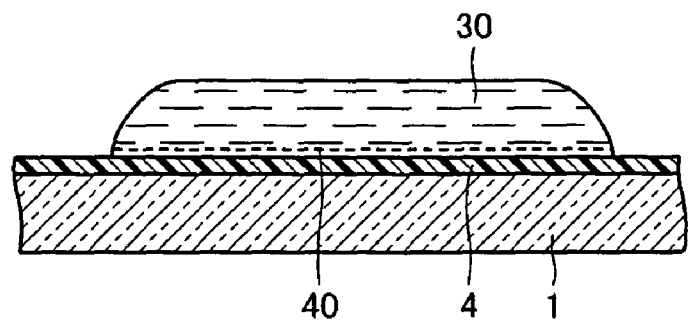
FIG. 10A is a first explanatory view of a problem associated with a manufacturing method of a conventional technique.
Figure 10B:
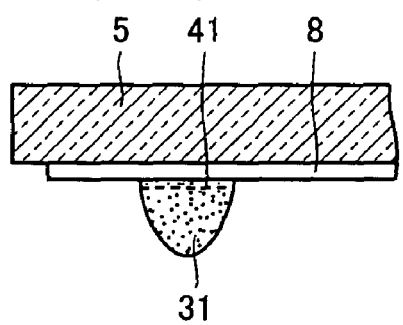
FIG. 10B is a second explanatory view of a problem associated with a manufacturing method of a conventional technique.
Figure 11:
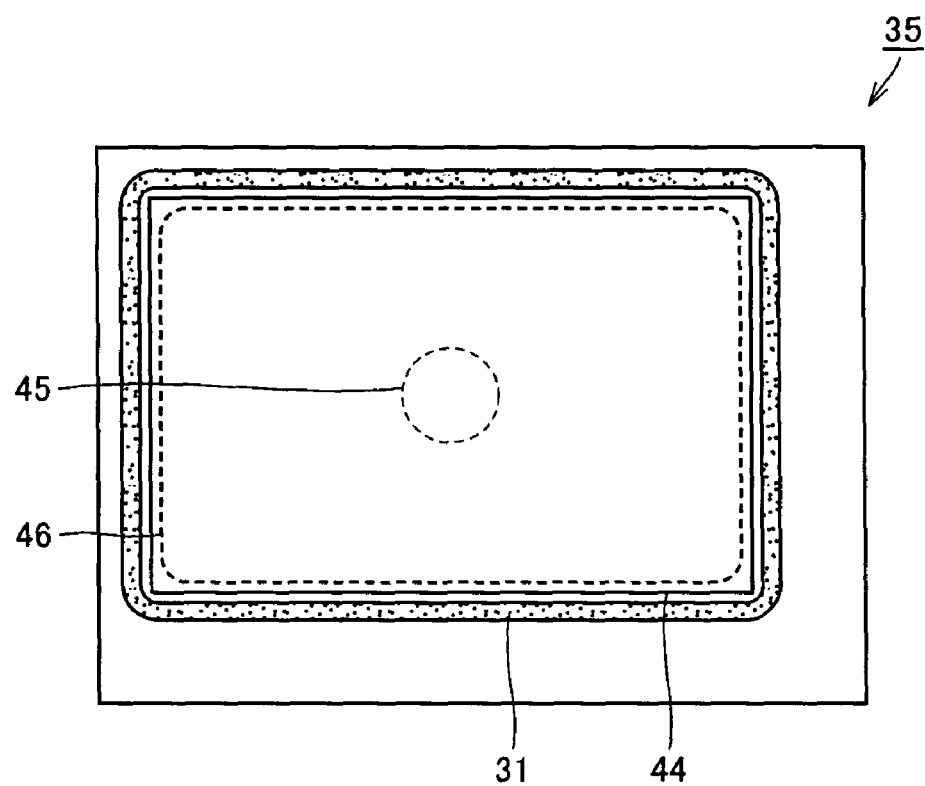
FIG. 11 is a schematic plan view illustrating a problem of a liquid crystal display panel of a conventional technique.

FIG. 1 is a process chart of a manufacturing method of a liquid crystal display panel according to a first embodiment. A liquid crystal display panel being manufactured is similarly structured as the liquid crystal display panel based on the conventional technique. That is, as shown in FIG. 7, on a main surface of TFT substrate 1, a scan line drive circuit 2 for driving a TFT is formed. On a main surface of scan line drive circuit 2, a pixel electrode layer 3 wherein the TFT and the like are formed is formed. On a main surface of pixel electrode layer 3, an alignment film 4 is formed. On a main surface of CF substrate 5, a color filter 6 is formed. On a main surface of color filter 6, a common electrode 7 is formed. On a main surface of common electrode 7, an alignment film 8 is formed. The liquid crystal display panel is constituted by these two substrates being bonded to each other, with a spacer 9 interposed between them. The two substrates are fixedly adhered by a sealant 31, and liquid crystal 30 is enclosed in a space surrounded by the two substrates and sealant 31.

The manufacturing method according to the present invention is similar to the manufacturing method according to the conventional techniques in that, an alignment film is formed in each of two substrates to be bonded to each other, and in that the method includes: a sealant arranging step of arranging a sealant on a main surface of one of or each of those substrates; a liquid crystal dropping step of dropping liquid crystal on one of the substrates; and a bonding step of bonding the two substrates together in a pressure-reduced atmosphere are included.

The manufacturing method of a liquid crystal display panel of the present embodiment includes, to be performed prior to the sealant arranging step, a deaerating step of arranging in a pressure-reduced atmosphere the substrates on each of which the alignment film is formed, and a releasing step of releasing the pressure-reduced atmosphere by an inert gas. The sealant arranging step is performed within about 30 minutes after the completion of the releasing step. After the alignment films are formed on the substrates, the substrates are arranged in a pressure-reduced atmosphere to remove moisture contained in the surface of the alignment films and the like. Thereafter, by releasing the pressure-reduced atmosphere by an inert gas such as $N_2$ gas or Ar gas, the inert gas is adsorbed by pores of the porous surface of the alignment films. Thus, moisture is prevented from being adsorbed by the alignment films when the substrates are brought in the air. Accordingly, no moisture remains between the sealant and the alignment film, and defective display around the sealant can be prevented.

In the present embodiment, liquid crystal is dropped on the substrate arranged opposite to the substrate to which the sealant is arranged. In the present embodiment, this substrate to which the liquid crystal is dropped is also arranged in the pressure-reduced atmosphere and thereafter an inert gas is introduced to release the pressure-reduced atmosphere. The adsorption of moisture can be prevented since the inert gas is adsorbed by the surface of the alignment films. As a result, moisture can be removed from the alignment film in a region where liquid crystal has been dropped, and defective display in the region where liquid crystal has been dropped and in the surrounding region can be prevented.

The inert gas in the pores of the porous alignment films and the like in place of moisture and the like is diffused into the air as time elapses. Thus, the concentration of the inert gas adsorbed by the alignment film decreases as time elapses. Accordingly, it is preferable to arrange the sealant as soon as possible after the releasing step, and in particular, it is preferable to do so within about 30 minutes after completion of the releasing step. As to the liquid crystal dropping step also, it is preferable to perform the step within about 30 minutes after the pressure-reduced atmosphere is released by the inert gas.

After the two substrates to be bonded to each other are both arranged in a pressure-reduced atmosphere, by releasing the pressure-reduced atmosphere by the inert gas, irrespective of which substrate is the substrate provided with the sealant or the substrate provided with the liquid crystal, defective display associated with the arrangement of the sealant and the dropping of the liquid crystal can be prevented. At the same time, moisture adsorbed by the alignment film and the like can be removed also from the region except for those regions where the sealant is arranged and where the liquid crystal is dropped. When the time during which the substrates are arranged in the air after being released by the inert gas is short, it is not necessary to perform again the deaerating step of arranging the substrates for a certain period in the pressure-reduced atmosphere immediately before bonding the substrates together, and the bonding step can be performed immediately after the pressure is reduced.

In the manufacturing method according to the present invention, even when the substrates are stored in the air for a long period after the alignment films are formed thereon, the deaerating step of arranging the substrates in the pressure-reduced atmosphere and the releasing step of releasing the pressure-reduced atmosphere by the inert gas may be performed immediately before the sealant is arranged or the liquid crystal is dropped. The present invention is different from a manufacturing method as disclosed in the conventional art references wherein the atmosphere around the substrates is substituted (purged) by the moisture-reduced air or an inert gas. In the present invention, the substrates are once arranged in a vacuum atmosphere, and after the moisture is fully evaporated and removed, an inert gas is adsorbed by the surfaces of the alignment films and the like. Unlikely to the manufacturing methods disclosed in the conventional art references, it is not necessary to store the substrates in an environment requiring moisture control or the like, and they can be stored in a normal atmosphere after the alignment films are formed. As a result, the manufacturing facility can be reduced in size, and the productivity is improved and the liquid crystal display panel can be manufactured inexpensively.

Among various substrates, conventionally when substrates of a large size with which multiple production is performed are stored in an atmosphere that is moisture-controlled, for example, the facility has been enormously large inevitably. However, as the deaerating step and the releasing step are performed immediately before the sealant is arranged in the manufacturing method according to the present application, such a large facility for storage is not necessary. As a result, for the large substrates also, the productivity is improved and the mass-production is achieved.

Additionally, as the arrangement of the sealant and the dropping of the liquid crystal can be performed at the atmospheric pressure, the arrangement of the sealant and the dropping of the liquid crystal can be performed easily. Accordingly, the works can be proceeded faster, and the productivity is improved.

Figure 2:
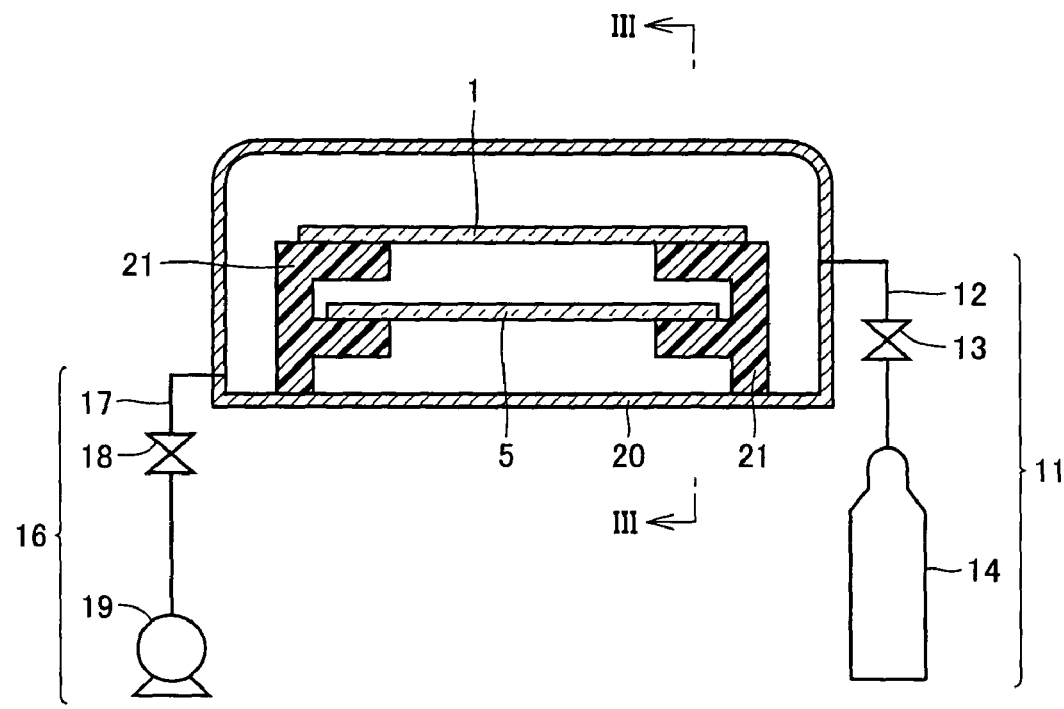
FIG. 2 is a schematic cross-sectional view of a manufacturing apparatus according to the first embodiment.
Figure 3:
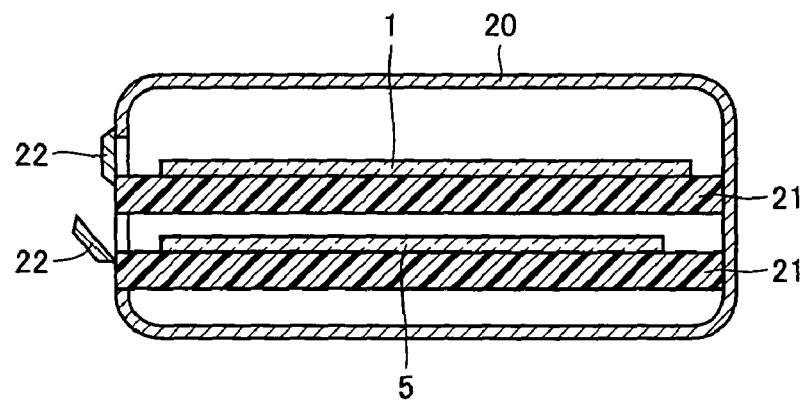
FIG. 3 is a schematic cross-sectional view of a vacuum chamber in the manufacturing apparatus according to the first embodiment.
Figure 4:
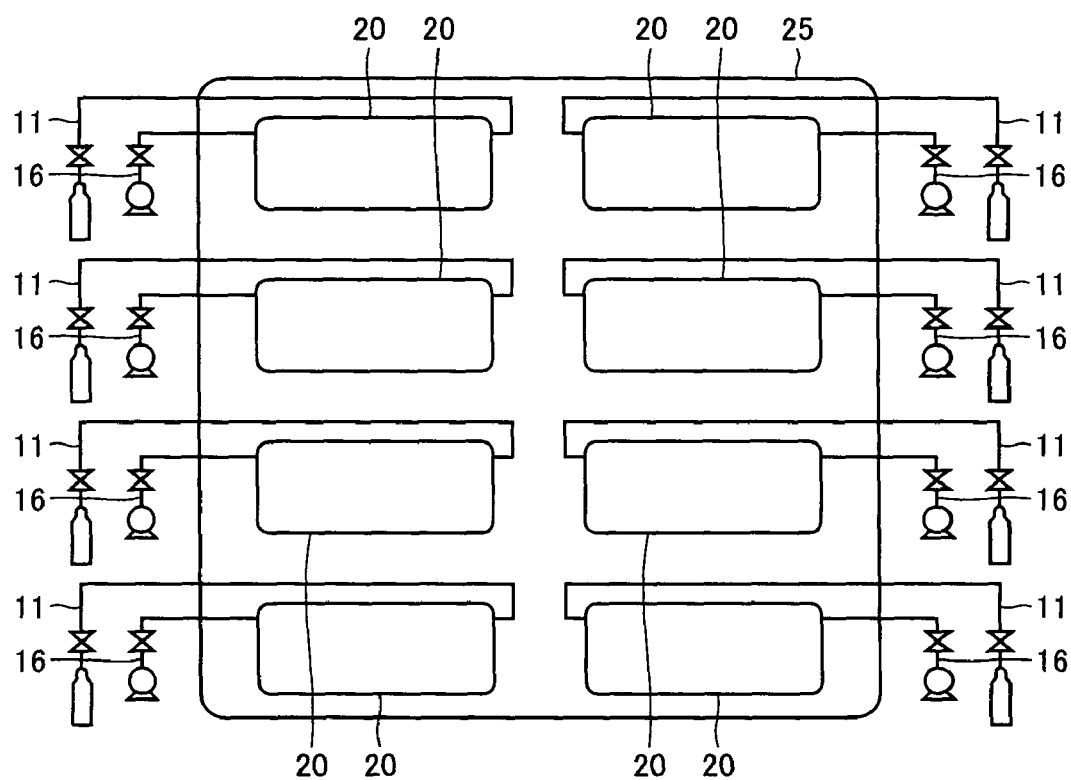
FIG. 4 is a schematic overall view of the manufacturing apparatus according to the first embodiment.

FIGS. 2-4 show explanatory views of a manufacturing apparatus of a liquid crystal display apparatus according to the present invention. FIG. 2 is a partial schematic cross-sectional view of the manufacturing apparatus according to the present invention. The manufacturing apparatus according to the present invention is used in a manufacturing method of a liquid crystal display panel including a sealant arranging step, a liquid crystal dropping step and a bonding step of bonding two substrates to each other. That is, the manufacturing apparatus is used for the liquid crystal dropping scheme.

The manufacturing apparatus of a liquid crystal display panel according to the present invention has pressure-reduced atmosphere forming means for arranging the substrates in a pressure-reduced atmosphere, and releasing means for releasing the pressure-reduced atmosphere by an inert gas. The two substrates, such as a TFT substrate 1 on which an alignment film is formed and a CF substrate 5 on which an alignment film is formed are arranged in a vacuum chamber 20. Vacuum chamber 20 is formed by aluminum, although it may be formed by stainless steel or the like. Vacuum chamber 20 in the present embodiment is formed such that it can accommodate the two substrates to be bonded to each other. Vacuum chamber 20 is formed so that it is hollow inside and is kept sealed from the outside. Inside vacuum chamber 20, two support bases 21 are formed facing to each other, as members for arranging the substrates. Support bases 21 are formed so that the two substrates to be bonded to each other can be arranged as aligned vertically. Support bases 21 are fixed to the bottom of vacuum chamber 20.

To vacuum chamber 20, vacuum evacuating means 16 for evacuating vacuum chamber 20 is connected. Vacuum evacuating means 16 includes an evacuation pipe 17, an evacuation valve 18 and a vacuum pump 19. In the present embodiment, vacuum evacuating means 16, vacuum chamber 20 and support bases 21 formed inside vacuum chamber 20 constitute pressure-reduced atmosphere forming means for arranging the substrates in a pressure-reduced atmosphere.

To vacuum chamber 20, inert gas introducing means 11 is connected as releasing means. Inert gas introducing means 11 includes an air supply pipe 12, an air supply valve 13 and a cylinder 14. Cylinder 14 is filled with an inert gas such as $N_2$ or Ar.

FIG. 3 is a cross-sectional view of the vacuum chamber through line III-III in FIG. 2. Vacuum chamber 20 is formed substantially as a rectangular parallelepiped. The two substrates which are TFT substrate 1 and CF substrate 5 are arranged on support bases 21 so that their main surfaces are horizontal. On the front side of vacuum chamber 20, an open/close doors 22 are formed corresponding to respective stages of support bases 21 that form two stages. Open/close doors 22 are formed so that they can be opened or closed, and formed to be large enough for putting in and taking out respective substrates. Open/close doors 22 are formed to keep the inside sealed when they are closed.

FIG. 4 is a schematic overall view of the manufacturing apparatus of the present embodiment. A plurality of the same manufacturing apparatuses each including inert gas introducing means 11, vacuum evacuating means 16 and vacuum chamber 20 are arranged in vacuum vessel 25. Vacuum chamber 20 are connected to respective inert gas introducing means 11 and vacuum evacuating means 16, and formed so that they can be evacuated and an inert gas can be introduced independently of each other. Inside each vacuum chamber 20, support bases 21 shown in FIG. 3 are formed so that two substrates to be bonded to each other can be accommodated.

The present apparatus is for example used in a deaerating step of arranging the substrates in a pressure-reduced atmosphere and a releasing step of releasing the pressure-reduced atmosphere by an inert gas, after forming the alignment films in the manufacturing method shown in FIG. 1. First, open/close door 22 is opened and TFT substrate 1 and CF substrate 5 are set to respective stages of support bases 21 in vacuum chamber 20. The substrates are arranged so that they are fully accommodated in vacuum chamber 20. In the present embodiment, TFT substrate 1 is arranged above and CF substrate 5 is arranged below, although the arrangement of them is not limited thereto, and either of the two may be arranged above. In order to mainly allow moisture in the formed alignment film to evaporate, it is preferable to arrange the substrates so that the side with the alignment film faces up in order to avoid contact between the alignment film and support base 21. After the substrates are arranged, all open/close doors 22 (see FIG. 3) are closed to seal vacuum chamber 20.

Next, vacuum pump 19 is driven and evacuation valve 18 is opened to evacuate vacuum chamber 20. Vacuum chamber 20 is evacuated to about 30 Pa. If the pressure inside vacuum chamber 20 is decreased rapidly the alignment films may be damaged. Accordingly, it is preferable that the pressure inside vacuum chamber 20 is reduced gradually. Accordingly, it is preferable to use a valve of which degree of opening is gradually changeable as evacuation valve 18. As evacuation valve 18 of the present embodiment, a valve that can increase the valve opening continuously and that can increase the valve opening stepwise is used. Reducing the pressure to about 30 Pa which is maintained for about 30 minutes, moisture in the surfaces of the alignment films, for example, is evaporated. Thus, the deaerating step is performed.

The pressure inside the vacuum chamber and the time for maintaining the reduced pressure are not limited thereto, and for example, the pressure inside the vacuum chamber may be at most 1 Pa, depending on the type of the alignment films. In other words, it is preferable to change the conditions of the deaerating step performed in the reduced pressure depending on the type of the formed alignment films and the like.

When the deaerating process is completed, subsequently, evacuation valve 18 is closed and air supply valve 13 is opened to introduce an inert gas from inert gas introducing means 11 into vacuum chamber 20. That is, the releasing step is performed. As air supply valve 13 of the present embodiment, a valve that can adjust the opening degree so that the pressure inside vacuum chamber 20 is gradually increased is used. Introduction of the inert gas is continued until the pressure in vacuum chamber 20 reaches the atmospheric pressure. When the pressure in vacuum chamber 20 reaches the atmospheric pressure, air-supply valve 13 is closed to stop introduction of the inert gas. In this state, until performing the sealant arranging step, the substrates are stored in vacuum chamber 20. Alternatively, if the time until the sealant arranging step is at most about 30 minutes, the substrates may be taken out of vacuum chamber 20 and stored.

As the manufacturing apparatus used in the liquid crystal dropping scheme includes the pressure-reduced atmosphere forming means and the releasing means for releasing the pressure-reduced atmosphere by the inert gas, moisture in the main surfaces of the substrates and in the alignment films formed on the main surfaces of the substrates can be substituted by an inert gas, whereby moisture is prevented from being adsorbed again even if the substrates are arranged in the air thereafter. As a result, defective display of the liquid crystal display panel can be prevented. After formation of the alignment films and until the bonding step, it is not necessary to control the moisture and the like continuously, and the substrates can be stored in the air after formation of the alignment films and until immediately before arranging the sealant or dropping the liquid crystal. Thus, the facility can greatly be simplified. Large substrates can also be processed easily, and the productivity is improved.

Additionally, as the vacuum chamber is formed to accommodate the two substrates to be bonded to each other, the two substrates can be processed simultaneously, and a waiting time for completing the process of one substrate, that is, the lead time until the next step can be minimized. Thus, the productivity is improved.

As shown in FIG. 4, since multiple of small vacuum chambers 20 are formed so that each chamber is evacuated and supplied with an inert gas independently of each other, the substrates can be arranged in the atmosphere of the inert gas until immediately before the sealant arranging step or until immediately before the liquid crystal dropping step if necessary. Thus, adsorption of moisture can more surely be prevented. Additionally, the manufacturing apparatus from which the substrates have been taken out can then be fed with the next substrates individually to perform the deaerating step and the releasing step, whereby the substrates can be processed successively. Thus, the waiting time in the manufacturing process can be minimized and the productivity is improved, whereby an inexpensive liquid crystal display panel can be provided.

While the manufacturing apparatus of the present embodiment is formed so that two substrates can be arranged inside the vacuum chamber, the invention is not limited to this manner and the apparatus may be formed so that one substrate or three or more substrates may be arranged in one chamber. Further, while one vacuum pump is attached per one vacuum chamber, a plurality of evacuation pipe may be connected to a large vacuum pump so that the vacuum chambers have their internal pressure adjusted by respective evacuation valves. Similarly, it is only necessary for the inert gas introducing means to have a structure for introducing an inert gas into the vacuum chamber, such as a plurality of air supply pipes connected to a multiple of parallel cylinders.

Second Embodiment

Figure 5:
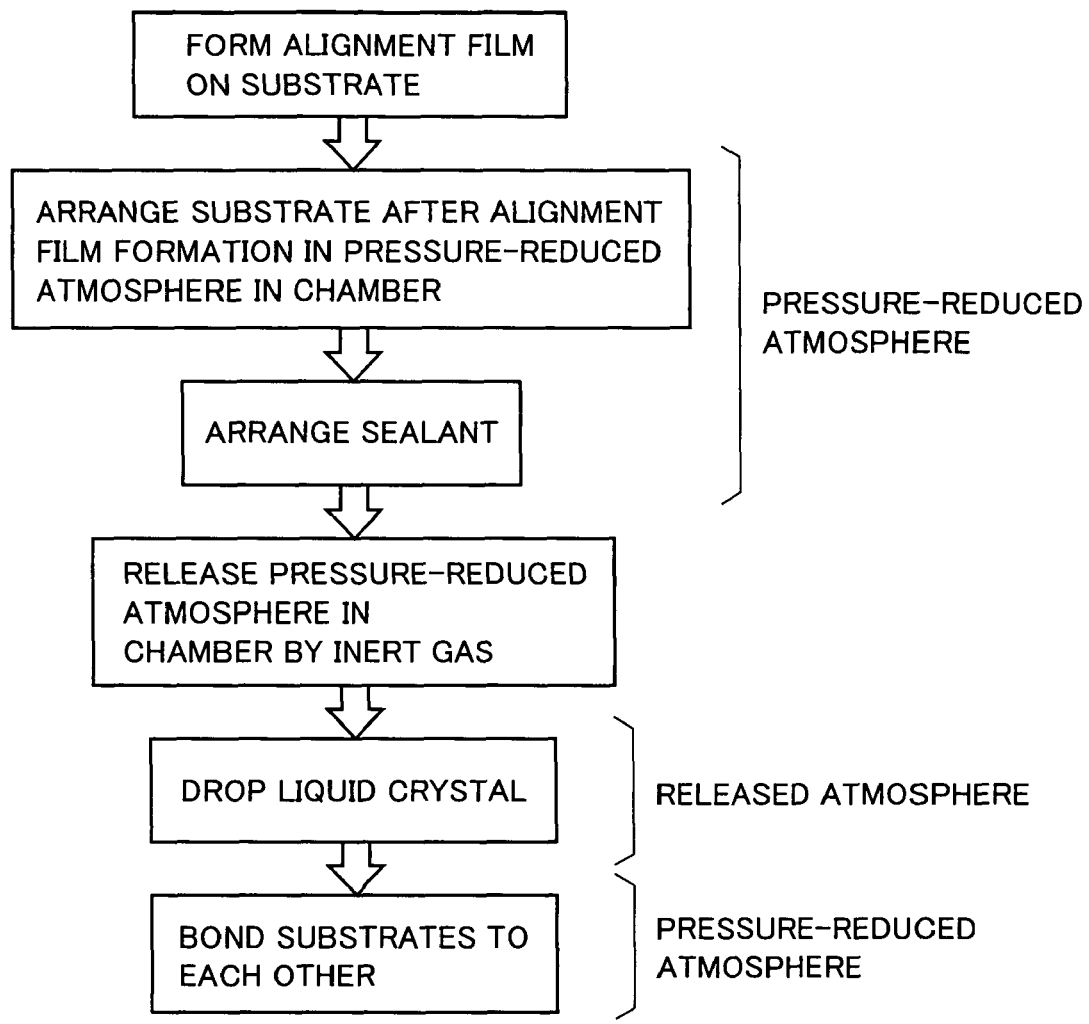
FIG. 5 is a process chart of a manufacturing method according to a second embodiment.

Referring to FIG. 5, a manufacturing method and a manufacturing apparatus of a liquid crystal display panel of a second embodiment of the present invention is described.

The present embodiment is similar to the manufacturing method according to the first embodiment in that alignment films are formed on substrates and liquid crystal is enclosed in accordance with the liquid crystal dropping scheme. The present invention is also similar to the first embodiment in that the substrates on which the alignment films are formed are arranged in a pressure-reduced atmosphere that is later released by an inert gas.

The manufacturing apparatus of the present embodiment is formed to have the structure of the manufacturing apparatus of the first embodiment that is further provided with a dispenser for arranging a sealant in the vacuum chamber, so that the sealant can be arranged in the vacuum chamber.

In the manufacturing method according to the present embodiment, a sealant arranging step of arranging a sealant on a main surface of one of or each of two substrates to be bonded to each other is performed in a pressure-reduced atmosphere. After reducing the pressure where the substrates are arranged, the pressure is maintained for a prescribed period so that moisture on the surface and inside the arrangement film is evaporated. Next, under this pressure-reduced atmosphere, the sealant is arranged on one of or each of the substrates.

After the arrangement of the sealant is completed, an inert gas such as $N_2$ gas or Ar gas is introduced inside the vacuum chamber so that the inside of the vacuum chamber attains the atmospheric pressure state, and the substrates are stored in the vacuum chamber. Immediately before a liquid crystal dropping step wherein liquid crystal is dropped on one of the substrates, the substrates are taken out of the vacuum chamber. Alternatively, if the time until the liquid crystal dropping step is short, the substrates may be taken out and stored in the air. Next, after performing the liquid crystal dropping step, a bonding step is performed.

In the manufacturing method of a liquid crystal display panel of the present embodiment, the sealant is arranged in a state where substrates are arranged in a pressure-reduced atmosphere. That is, the sealant is arranged on a top surface of the arrangement film from which moisture is fully removed. By employing this method, moisture is prevented from being retained in the alignment film in a region where the sealant is arranged, and defective display around the region where the sealant is arranged can be prevented. Further, by releasing the pressure-reduced atmosphere in the vacuum chamber with an inert gas, moisture can be prevented from being mixed when dropping the liquid crystal.

When the substrate to which the liquid crystal is dropped and the substrate to which the sealant is arranged are different, the substrate to which liquid crystal is dropped is also arranged in the pressure-reduced atmosphere in the vacuum chamber in advance, and thereafter subjected to the releasing step of releasing the vacuum chamber by an inert gas. By employing this method, also from the substrate to which liquid crystal is dropped, the moisture of the alignment film can be removed in advance, and defective display in the region to which liquid crystal is dropped can be prevented. Similarly to the first embodiment, it is preferable to drop the liquid crystal within 30 minutes after releasing the pressure-reduced atmosphere by an inert gas. By employing this method, defective display can surely be prevented even if the liquid crystal dropping step is performed in a normal atmosphere. Accordingly, the structure of the liquid crystal dropping apparatus can be simplified, and the productivity improves as works are facilitated.

Also in a case where the sealant is arranged on the substrate to which liquid crystal is dropped, it is preferable for the opposing substrate to be subjected to the deaerating step and the releasing step until the bonding step. By employing this method, the necessity of performing the deaerating step immediately before the bonding step is eliminated, whereby the manufacturing step is reduced and the productivity is improved.

While the manufacturing apparatus of a liquid crystal display panel of the first embodiment is formed to accommodate two substrates to be bonded to each other, the apparatus of the present embodiment may be formed so that only one substrate can be arranged inside the vacuum chamber if the substrate to which the sealant is arranged and the substrate to which the liquid crystal is dropped are the same, so that this substrate only is processed.

The rest of the manufacturing method and manufacturing apparatus is the same as in the first embodiment, and therefore description thereof is not repeated.

Third Embodiment

Figure 6:
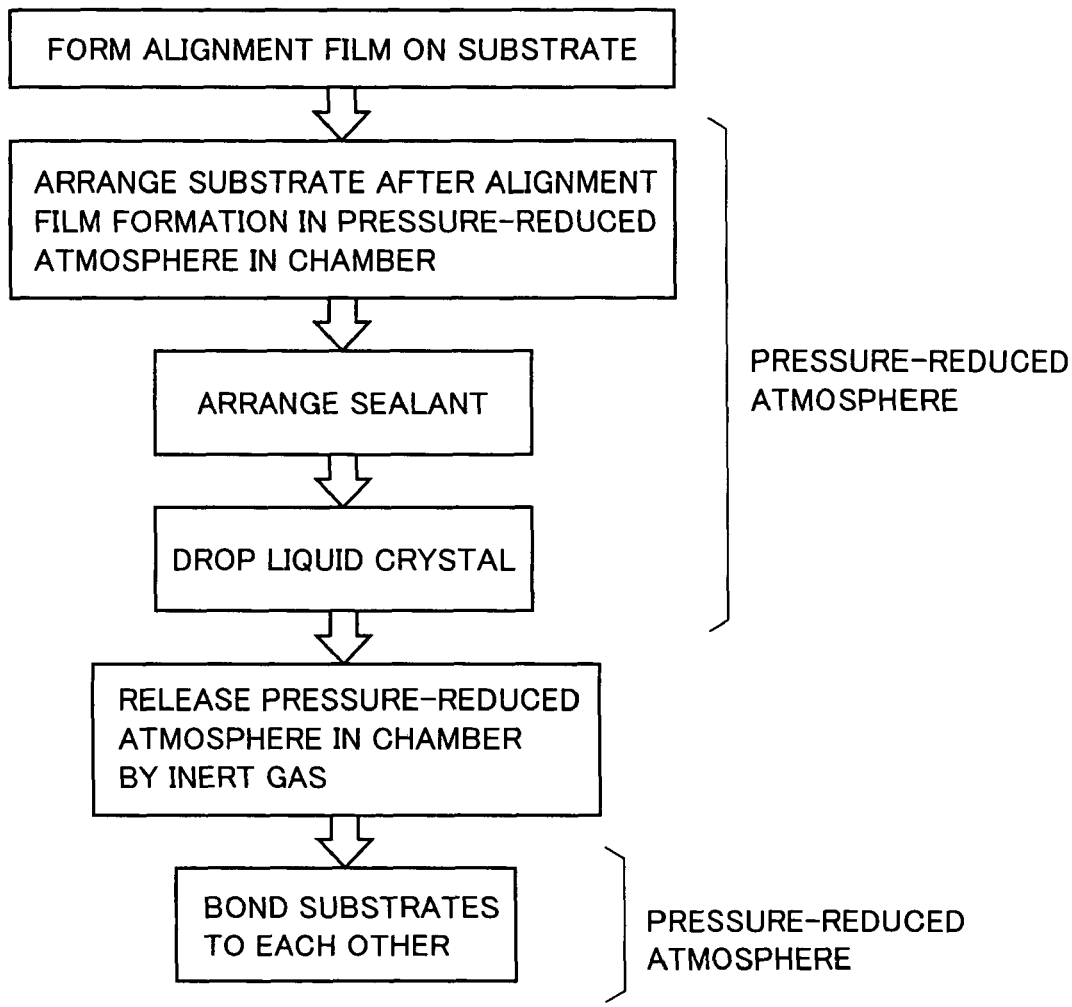
FIG. 6 is a process chart of a manufacturing method according to a third embodiment.

Referring to FIG. 6, a manufacturing method and a manufacturing apparatus of a liquid crystal display panel of a third embodiment of the present invention is described.

The present embodiment is similar to the manufacturing method according to the first embodiment in that alignment films are formed on substrates and liquid crystal is enclosed by the liquid crystal dropping scheme. The present invention is also similar to the first embodiment in that the substrates on which the alignment films are formed are arranged in a pressure-reduced atmosphere that is later released by an inert gas.

In the present embodiment, the sealant arranging step and the liquid crystal dropping step are performed in a pressure-reduced atmosphere. Thereafter, the pressure-reduced atmosphere in the vacuum chamber is released by an inert gas, and the substrates are stored in the vacuum chamber until the bonding step.

Inside the vacuum chamber of the present embodiment, in addition to the structure of the vacuum chamber of the first embodiment, a dispenser for arranging the sealant and a dispenser for dropping the liquid crystal are arranged. The arrangement of the sealant and dropping of the liquid crystal may be performed to either one of the substrates. Additionally, the arrangement of the sealant may be performed to both of the substrates.

By employing this manufacturing method, as the arrangement of the sealant and the dropping of the liquid crystal are performed in the state where moisture is fully removed from the surfaces of the alignment films, moisture can be removed and it is prevented from mixing into the liquid crystal. As a result, defective display in the region to which the sealant is arranged, in the region to which the liquid crystal is dropped and in the region around the same can more surely be prevented. Further, as the pressure-reduced atmosphere in the vacuum chamber is released by an inert gas and the substrates can be stored immediately before being bonded, moisture is prevented from being adsorbed by the substrates and the alignment films during this period, and therefore defective display of the liquid crystal display panel is prevented. If the period after the releasing step during which the substrates are stored in the air is short, adsorption of moisture by the substrates can be prevented and a deaerating step immediately before the bonding step can be eliminated, and thus the manufacturing time can be reduced.

The rest of the manufacturing method and manufacturing apparatus is the same as in the first embodiment, and therefore description thereof is not repeated.

In the above-described embodiment, the deaerating step is mainly performed before the sealant arranging step. However, if it is only intended to prevent moisture from mixing in the liquid crystal dropping step, the deaerating step and the like may not be performed to the substrate to which the sealant is arranged before the sealant arranging step. The substrate to which the liquid crystal is dropped may only subjected to the deaerating step before the liquid crystal dropping step and to the releasing step before the bonding step.

While a color liquid crystal display panel has mainly been described in the above embodiment, the invention is not limited to color liquid crystal and it is also applicable to a black-and-white liquid crystal display panel.

It should be understood that the embodiments disclosed herein are illustrative and non-restrictive in every respect. The scope of the present invention is defined by the terms of the claims, rather than the description and example above, and is intended to include any modifications and changes within the scope and meaning equivalent to the terms of the claims.

INDUSTRIAL APPLICABILITY

The present invention is applicable to the manufacture of a liquid crystal display panel. In particular, it is advantageously applicable to a manufacturing method of a liquid crystal display panel and a manufacturing apparatus thereof which are carried out in accordance with the liquid crystal dropping scheme.

The invention claimed is:

1. A manufacturing method of a liquid crystal display panel, comprising:
    a sealant arranging step of arranging a sealant on a main surface of one of or each of two substrates to be bonded to each other;
    a liquid crystal dropping step of dropping liquid crystal on one of said two substrates wherein each of the two substrates has an alignment film; and
    a bonding step of bonding said two substrates to each other, wherein said method further includes:
    to be performed prior to said sealant arranging step, a deaerating step of arranging in a pressure-reduced atmosphere at least a substrate on which said sealant is to be arranged out of said two substrates, such substrate being placed in the pressure reduced atmosphere with the alignment film exposed; and
    to be performed prior to said bonding step, a releasing step of releasing said pressure-reduced atmosphere by an inert gas.

2. The manufacturing method of a liquid crystal display panel according to claim 1, wherein
    said releasing step is performed prior to said sealant arranging step.

3. The manufacturing method of a liquid crystal display panel according to claim 1, wherein
    said sealant arranging step is performed in a released atmosphere.

4. The manufacturing method of a liquid crystal display panel according to claim 3, wherein
    said sealant arranging step is performed within 30 minutes after said releasing step.

5. The manufacturing method of a liquid crystal display panel according to claim 1, wherein
    said deaerating step includes a step of arranging said two substrates together in said pressure-reduced atmosphere.

6. The manufacturing method of a liquid crystal display panel according to claim 5, wherein
    said releasing step is performed after said sealant arranging step and said liquid crystal dropping step.

7. The manufacturing method of a liquid crystal display panel according to claim 1, wherein
    said releasing step is performed prior to said liquid crystal dropping step, and
    said liquid crystal dropping step is performed within 30 minutes after said releasing step.

8. A manufacturing method of a liquid crystal display panel, comprising:
- a sealant arranging step of arranging a sealant on a main surface of one of or each of two substrates to be bonded to each other;
- a liquid crystal dropping step of dropping liquid crystal on one of said two substrates wherein each of the two substrates has an alignment film; and
- a bonding step of bonding said two substrates to each other, wherein said method further includes:
- to be performed prior to said sealant arranging step, a deaerating step of arranging in a pressure-reduced atmosphere at least a substrate on which said sealant is to be arranged out of said two substrates, such substrate being placed in the pressure reduced atmosphere with the alignment film exposed; and
- to be performed prior to said bonding step, a releasing step of releasing said pressure-reduced atmosphere by an inert gas;
- wherein said releasing step is performed prior to said sealant arranging step and said sealant arranging step is performed in an inert gas atmosphere provided by the releasing step.

* * * * *